United States Patent
Cai et al.

(10) Patent No.: US 9,898,834 B2
(45) Date of Patent: Feb. 20, 2018

(54) METHOD AND APPARATUS FOR GENERATING A BITSTREAM OF REPETITIVE STRUCTURE DISCOVERY BASED 3D MODEL COMPRESSION

(75) Inventors: Kangying Cai, Beijing (CN); Wenfei Jiang, Beijing (CN); Jiang Tian, Beijing (CN)

(73) Assignee: THOMSON Licensing, Issy-les-Moulineaux (FR)

(*) Notice: Subject to any disclaimer, the term of this patent is extended or adjusted under 35 U.S.C. 154(b) by 0 days.

(21) Appl. No.: 14/356,737

(22) PCT Filed: Nov. 25, 2011

(86) PCT No.: PCT/CN2011/082942
§ 371 (c)(1),
(2), (4) Date: May 7, 2014

(87) PCT Pub. No.: WO2013/075329
PCT Pub. Date: May 30, 2013

(65) Prior Publication Data
US 2014/0285487 A1    Sep. 25, 2014

(51) Int. Cl.
*G06T 9/00* (2006.01)
*H04N 19/70* (2014.01)

(52) U.S. Cl.
CPC ............ *G06T 9/001* (2013.01); *H04N 19/70* (2014.11)

(58) Field of Classification Search
CPC .................................. G06T 9/00; H04N 19/70
(Continued)

(56) References Cited

U.S. PATENT DOCUMENTS 6,272,180 B1 * 8/2001 Lei ................... H04N 19/63
                                                         375/240.16
6,961,060 B1 * 11/2005 Mochizuki ............. A63F 13/12
                                                         345/473
(Continued)

FOREIGN PATENT DOCUMENTS

CN        101939993        1/2011
EP         1524859          4/2005
(Continued)

OTHER PUBLICATIONS

Kangying Cai; Exploiting repeated patterns for efficient compression of massive models; Proceeding VRCAI '09 Proceedings of the 8th International Conference on Virtual Reality Continuum and its Applications in Industry; 2009; pp. 145-150.*
(Continued)

*Primary Examiner* — Gregory J Tryder
*Assistant Examiner* — Michael Le
(74) *Attorney, Agent, or Firm* — Brian J. Dorini; Paul P. Kiel

(57) ABSTRACT

A method and apparatus for generating a bitstream representative of a 3D model, and a method and an apparatus for processing the same. A 3D model is modeled by using a using a 'pattern-instance' representation, wherein a pattern is a representative geometry of a repetitive structure, and the connected components belonging to the repetitive structure is call an instance of the corresponding pattern. After discovery of the repetitive structures and their transformations and properties, the present embodiments provide for generating a bitstream in either a first format or a second format. In the first format, the pattern ID and its associated transformation and property information are grouped together in the bitstream, and in the second format the pattern ID,
(Continued)

3D models with connected components and repetitive structures transformation property and property information are grouped together according to information type.

18 Claims, 2 Drawing Sheets

(58) Field of Classification Search
 USPC .......................................... 345/419, 420, 694
 See application file for complete search history.

(56) References Cited

U.S. PATENT DOCUMENTS

| | | | |
|---|---|---|---|
| 2005/0084006 A1 | 4/2005 | Lei et al. | |
| 2008/0170795 A1 | 7/2008 | Akenine-Moller | |
| 2009/0184956 A1* | 7/2009 | Kim | G06T 9/20 345/420 |
| 2010/0231688 A1 | 9/2010 | Park et al. | |
| 2010/0278269 A1 | 11/2010 | Andersson et al. | |
| 2010/0284461 A1 | 11/2010 | Andersson et al. | |

FOREIGN PATENT DOCUMENTS

| | | |
|---|---|---|
| EP | 2216750 | 8/2010 |
| EP | 2261859 | 12/2010 |
| JP | 10283495 | 10/1998 |
| JP | 2005124200 | 5/2005 |
| JP | 2011509594 | 3/2011 |
| KR | 20110096112 | 8/2011 |
| WO | WO2010096189 | 8/2010 |
| WO | WO2010142743 | 12/2010 |
| WO | WO2010149492 | 12/2010 |

OTHER PUBLICATIONS

Dinesh Shikhare, Sushil Bhakar and S. P. Mudur; Compression of Large 3D Engineering Models using Automatic Discovery of Repeating Geometric Features; Signal Processing, Stuttgart, Germany, Nov. 21-23, 2001; pp. 233-240.*

ITU-T:H264 Standard, Nov. 2007.

Cai et al: "Exploiting Repeated Patterns for Efficient Compression of Massive Models", VRCAI 2009, Yokohama, Japan, Dec. 14-15, 2009.

* cited by examiner

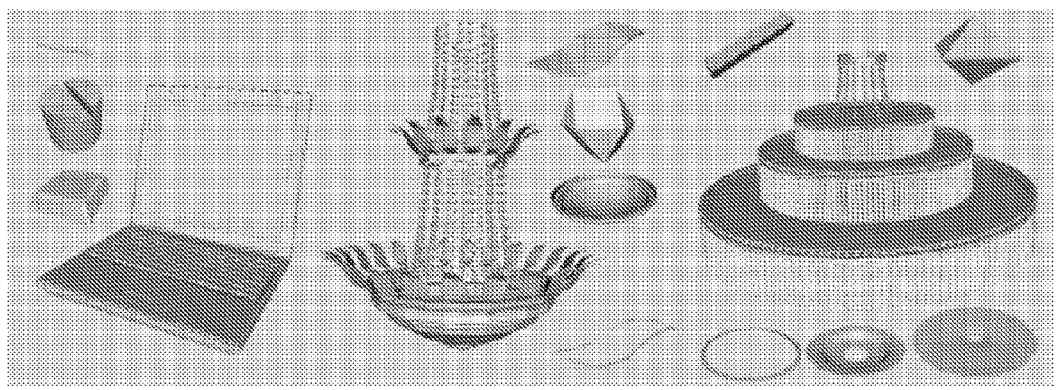
Fig. 1 3D models with connected components and repetitive structures
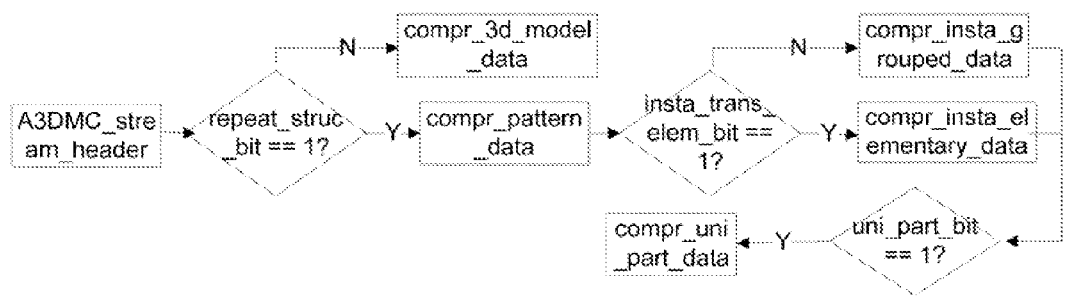
Fig. 2 A3DMC compressed bitstream

METHOD AND APPARATUS FOR GENERATING A BITSTREAM OF REPETITIVE STRUCTURE DISCOVERY BASED 3D MODEL COMPRESSION

This application claims the benefit, under 35 U.S.C. § 119 of WO Patent Application PCT/CN2011/082942, filed 25 Nov. 2011.

FIELD OF THE INVENTION

This invention relates to a bitstream syntax and semantics of repetitive structure discovery based on 3D model compression algorithm, a method and an apparatus for generating the bitstream representative of a 3D model, and a method and an apparatus for processing the same.

BACKGROUND OF THE INVENTION

In practical applications, many 3D models consist of a large number of connected components. And these multi-connected 3D models usually contain lots of repetitive structures in various transformations, as shown in Fig. Efficient compression methods for this kind of 3D models should be able to extract the redundancy existing in the repetitive structures.

The owner of the current invention also co-owns a PCT application entitled "Efficient Compression Scheme for Large 3D Engineering Models" by K. Cai, Y. JIN, and Z. Chen (WO2010149492), which teaches a compression method for 3D models that consist of many small to medium sized connected components, and that have geometric features which repeat in various positions, scales and orientations, the teachings of which are specifically incorporated herein by reference. This method discovers the structures repeating in various positions, orientations and scaling factors. Then the 3D model is organized into "pattern-instance" representation. A pattern is the representative geometry of the corresponding repetitive structure. The connected components belonging to a repetitive structure are called instances of the corresponding pattern and represented by their transformation, i.e. the positions, orientations and possible scaling factors, regarding to the pattern. The orientation of an instance is represented by 2 orthogonal axes represented by (x0, y0, z0) and (x1, y1, z1) in Cartesian coordinate system, or (alpha, beta, gamma) in spherical coordinate system.

The owner of the current invention also co-owns a PCT application entitled "Bitstream Syntax and Semantics of Repetitive Structure Discovery Based 3D Model Compression Algorithm" by K. Cai, W. Jiang, and J. Tian (PCT/CN2011/076991), which teaches a two modes for compressing instance transformation data.

BRIEF SUMMARY OF THE INVENTION

However, there is a need to provide a method and apparatus that can deal with 3D model properties, such as normal, color and texture coordinates, and can compress instances whose transformation includes reflection transformation Accordingly, the present principles provide a method and apparatus that may be used to compress 3D model properties, such as normal, color and texture coordinates, and compress instances whose transformation includes reflection transformation and generate a bitstream that includes this information.

The present principles provide a method for generating a bitstream representing a 3D model, comprising: accessing information related to instances of a pattern associated with some structures, the information including a pattern identifier and transformation information associated with each respective pattern; and generating a bitstream representative of the instance, including the pattern identifier and the pattern transformation data disposed in the bitstream in one of a first format and a second format as described below. The present principles also provide for an apparatus for performing these steps. The bitstream may also include information associated with a plurality of patterns and respective information associated with the plurality of patterns in one of a first format and the second format.

The present principles also provide a method for processing a bitstream representing a 3D model comprising: determining whether the bitstream includes information related to an instance of a pattern associated with a structure, the information including the pattern identifier and transformation information associated with the pattern, in a first format or a second format as described below; accessing the pattern identifier and the transformation information associated with the pattern in response to the determining step; and decoding the pattern identifier and the transformation information to generate 3D model data. The present principles also provide an apparatus for performing the steps described above. The bitstream may also include information associated with a plurality of patterns and respective information associated with the plurality of patterns in one of a first format and the second format.

The present principles also provide a computer readable storage medium having stored thereon instructions for generating or processing a bitstream according to the methods described above.

The present principles also provide a computer readable storage medium having stored thereon a bitstream generated according to the methods described above.

BRIEF DESCRIPTION OF THE DRAWINGS

FIG. 1 shows exemplary 3D models with a large number of connected components and repetitive structures;

FIG. 2 shows an exemplary process including steps for determining the structure of a bitstream based on a repetitive structure discovery based compression algorithm, A3DMC;

DETAILED DESCRIPTION

Only the geometry is checked during repetitive structure discovery. One instance can either share property data with the corresponding pattern or have its own property data. The properties of an instance will be compressed separately if it doesn't share properties with the pattern.

The instance transformation can de divided into four parts, reflection part, rotation part, translation part, and possible scaling part. The four parts are compressed separately.

All patterns are compressed together in order to achieve more bitrates saving. During decoding, patterns need to be separated from each other before restoring instances.

Figure 3:
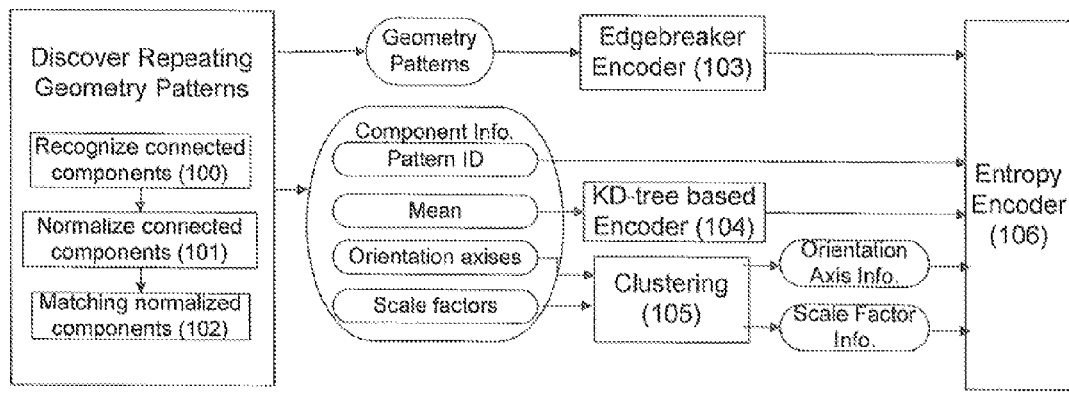
FIG. 3 shows an exemplary encoder related to the present principles.
Figure 4:
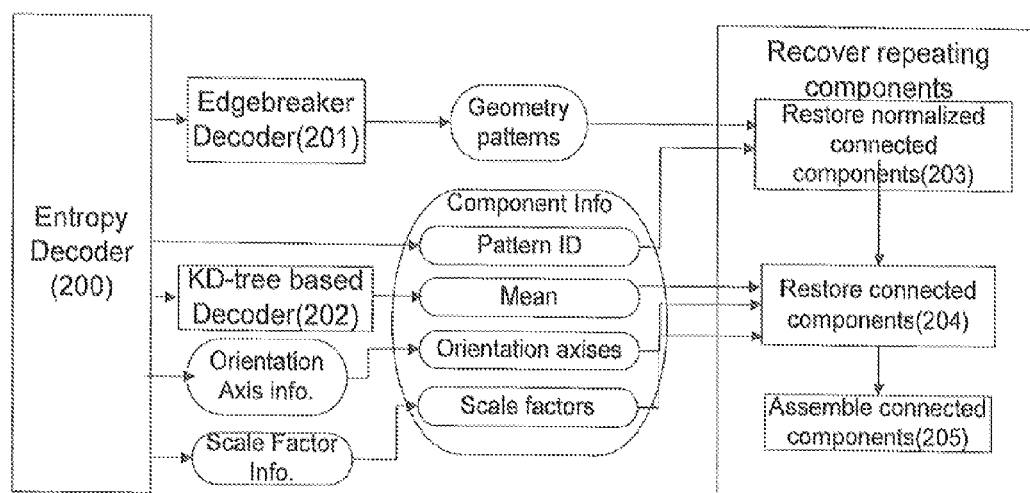
FIG. 4 shows an exemplary decoder related to the present principles.

FIGS. 3 and 4 show an exemplary encoder and decoder suitable for implementing aspects of the present principles. The details of the encoder and decoder are provided in Applicant's co-owned PCT applications WO2010149492 and PCT/CN2011/076991, and the descriptions therein are expressly incorporated by reference in this application. As will be appreciated by those skilled in the art, the CODEC can be implemented in hardware, software or firmware, or combinations of these modalities, in order to provide flexibility for various environments in which such 3D rendering is required. Application specific integrated circuits (ASICs), programmable array logic circuits, discrete semiconductor circuits, and programmable digital signal processing circuits, computer readable media, transitory or non-transitory, among others, may all be utilized to implement the present invention. These are all non-limiting examples of possible implementations of the present invention, and it will be appreciated by those skilled in the art that other embodiments may be feasible.

Two Instance Compression Modes

While we want the bitstream to embed all the instance data, we also want it to be efficient and address several applications where sometimes either bitstream size or decoding efficiency or error resilience matters the most.

Therefore, we propose two options for how to put the data of one instance, i.e. its pattern ID (for example, the ID being the actual position of the pattern in the pattern compression data stream, 1 for first pattern, 2 for second pattern, . . . ), its reflection transformation part (F), its translation transformation part (T), its rotation transformation part (R) and its scaling transformation part (S), of the patterns in the bitstream. Both of them have their own pros and cons.

Option (A) elementary instance data mode (ID, F, T, R, S, ID, F, T, R, S . . . ): Using this mode, the pattern ID, reflection transformation part, translation transformation part, rotation transformation part and scaling transformation part of one instance are packed together in the bitstream.
Pros:
  It is error resilient. The decoder can recover from losing the transformation of some instances.
  On-line decoding. That means the instances can be decoded one by one during actual reading of the compressed bitstream. There is no need to wait for finishing reading the whole compressed bitstream.
  Higher codec speed.
  The codec needs no buffer.
Cons:
  Relative larger compressed 3D model size.

Option (B) grouped instance data mode (ID, ID, F, F, T, T, R, R, S, S): Using this mode, information is grouped together based on information type, that is, the pattern ID, reflection transformation part, translation transformation part, rotation transformation part and scaling transformation part of one instance are packed together in the bitstream.
Pros:
  Relative smaller compressed 3D model size.
Cons:
  The decoder is no longer error resilient.
  Off-line decoding. That means the decoder can only start decoding after reading the whole compressed bitstream.
  Lower codec speed.
  Buffer is necessary.

The current bitstream definition will include both of the above two options. Then the users can choose the one which fits their applications better. A particular implementation may choose to only implement one of the two instance data modes. For that case, the bitstream definition should be changed accordingly. Refer to the "Bitstream syntax and semantics" section for the detail.

Since instances may have larger decoding error, which is defined as the distance between the original component and the component restored from the pattern and instance transformation, some data fields of the bitstream are defined to denote the compressed instance decoding error to guarantee the decoded 3D model quality.

Whether or not to compress the decoding error of an instance is based on, for example, the quality requirement.

Compression of Instance Transformation

As shown below, the instance transformation can de divided into four parts, reflection part (Refle), rotation part (Rotat), translation part (Transl), and possible scaling part.

$$\text{Transf\_Mat} = \begin{bmatrix} \text{Rotat\_Refle} & \text{Transl} \\ 0\ 0\ 0 & 1 \end{bmatrix} * \text{Scaling}$$

$$\text{Rotat\_Refle} = \text{Refle} * \text{Rotat}$$

The reflection part may be represented by a 1-bit flag, for example, as described in PCT application (fill in application number) entitled "Method and Apparatus for Reflective Symmetry Based 3D Model Compression" by W. Jiang, K. Cai, and T. Luo.

The rotation part is a 3×3 matrix. The three columns (or rows) of the rotation part are unit orthogonal vectors. In order to address several applications where sometimes either decoding efficiency or decoding error matters the most, we propose two options for how to compress the rotation part. Both of them have their own pros and cons.

Option (A) Cartesian mode. In Cartesian coordinate system, the rotation part can be represented by 2 orthogonal axes, (x0, y0, z0) and (x1, y1, z1), and compressed, for example, as described in PCT application (PCT/CN2011/077277) "entitled Conditional Error Correction in Orientation AX's Encoding" by W. Jiang, K. Cai, and J. Tian.
Pros:
  Higher codec speed.
Cons:
  Relative less accurate decoded 3D model.

Option (B) Spherical mode. Using this mode, the rotation part can be converted to Euler angles (alpha, beta, gamma), for example, by "Computing Euler Angles from a Rotation Matrix, Greg Slaubaugh, 1999, Reports, and be compressed, for example, as described in PCT application (PCT/CN2011/077271) entitled "Orientation Encoding" by W. Jiang, K. Cai, and J. Tian.
Pros:
  More accurate decoded 3D model.
Cons:
  Relative slower codec speed.

The current bitstream definition will include both of the above two options. Then the users can choose the one which fits their applications better. A particular implementation might choose to only implement one of the two instance rotation compression modes. For that case, the bitstream definition should be changed accordingly. Refer to the "Bitstream syntax and semantics" section for the details.

The translation part is represented by a vector (x, y, z) (pseudo translation vector). While using grouped instance transformation mode, all pseudo instance translation vectors are compressed by octree (OT) decomposition based compression algorithm, for example, by using methods described in PCT Application (PCT/CN2011/077279), entitled "A Model Adaptive Entropy Coding for Octree Compression" by W. Jiang, K. Cai, and Z. Chen, which recursively subdivides the bounding box of all pseudo instance translation vectors in an octree data structure. We represent each octree node subdivision by the 8-bit long occupancy code, which uses a 1-bit flag to signify whether a child node is nonempty. An occupancy code sequence describing the octree is generated by breadth first traversing the octree. We compress the occupancy code sequence by dividing it into several intervals and compressing them with different probability models. Since instances may have extremely close pseudo translation vectors, which we call duplicate translation vectors, some data fields of the bitstream are defined to denote the duplicate translation vectors.

The scaling part is represented by the uniform scaling factor S of the instance and compressed by the lossless compression algorithm for floating point numbers, for example, by "Lossless Compression of Predicted Floating-Point Geometry, M. Isenburg, et al., Computer-Aided Design, Volume 37, Issue 8, pages 869-877, July 2005.

Compression of Instance Properties

In practical applications, besides geometry, 3D models usually have various properties, such as normal, color and texture coordinates. Requiring instances have the same properties of patterns will limit the number of repetitive structures can be discovered and decrease the compression ratio of A3DMC. Thus we only check the geometry during repetitive structure discovery and the instance may have properties different with the corresponding pattern's properties.

When the elementary instance data mode is used, one data field is defined to denote how to get the properties of an instance from the bitstream.

Case A: The instance shares the pattern property data and doesn't need data fields to represent its properties.

Case B: The instance has its own properties and need separate data fields to represent its properties in the bitstream.

The property data of one instance (P) follows the other data of the instance, i.e. (ID, F, T, R, S, P, ID, F, T, R, S, P . . . ). When the grouped instance data mode is used, all instances should either share the pattern property data or have their own property data. The instance data part of the bitstream is like (ID, ID, F, F, T, T, R, R, S, S, P, P). We use the same 3D model property data field definition of ISO/IEC 14496-16.

General Structure of the Compressed Bitstream

The decomposition of the general structure of the compressed bitstream of our repetitive structure discovery based compression algorithm, A3DMC, is as shown in FIG. 2. The bitstream starts with the header buffer (A3DMC_stream_header), which contains all the necessary information for decoding the compressed stream: information of whether or not there is at least one repetitive structure in the original model, the 3D model compression method used for compressing geometry, connectivity and properties of all 3D objects (patterns and other parts if necessary), information of whether or not the "grouped instance transformation mode" or "elementary instance transformation mode" is used in this bitstream, information of whether or not there are some parts of the original model which are not repetitive (which we reference as unique part), information of whether or not instance decoding error will be compensated, information of the type of properties instances may have, etc.

If there is no repetitive structure in the original model (repeat_struc_bit !=1), the left part of the bitstream is the compressed input 3d model using the 3D model compression method indicated in A3DMC_stream_header. Otherwise, the next part in the bitstream is the compressed result of all patterns. Depending on which instance transformation packing mode is chosen in this bitstream, either compr_insta_grouped_data or compr_insta_elementary_data is the next part in the bitstream. If there is unique part in the original 3D model, compr_uni_part_data is attached. Otherwise, the bitstream ends.

Bitstream Syntax and Semantics

Specification of Syntax Functions, Categories, and Descriptors

In addition to the syntax functions, categories and descriptors already used in SC3DMC specification, we will also use the following two:

f(n): fixed-length coded bit string using n bits (written from left to right) for each symbol. n depends on the code length for each symbol ec(v): entropy-coded (e.g., arithmetic coded) syntax element, including possibly configuration symbols.

Bitstream Syntax and Semantics

A3DMC_stream class

Syntax

|  | Num. of Bits | Descriptor |
|---|---|---|
| class A3DMC_stream{ |  |  |
|     A3DMC_stream_header |  |  |
|     A3DMC_steam_data |  |  |
| } |  |  |

Semantics

A3DMC_stream_header: contain the header buffer.

A3DMC_steam_data: contain the data buffer.

A3DMC_stream_header class

Syntax

|  | Num. of Bits | Descriptor |
|---|---|---|
| class A3DMC_stream_header{ |  |  |
|     repeat_struc_bit | 1 |  |
|     3d_model_compr_mode | 2 |  |
|     QP | 5 |  |
|     If(repeat_struc_bit == 1){ |  |  |
|         pattern_num | 8 |  |
|         If(pattern_num == 255){ |  |  |
|             pattern_num_2 | 16 |  |
|         } |  |  |
|         instance_num | 16 |  |
|         If(instance_num == 65535){ |  |  |
|             instance_num_2 | 32 |  |
|         } |  |  |
|         insta_trans_elem_bit | 1 |  |
|         insta_rotat_mode_bit | 1 | cartesian/spherical coordinate |
|         use_scaling_bit | 1 |  |
|         uni_part_bit | 1 |  |
|         error_compensate_enable_bit | 1 |  |

-continued

| | Num. of Bits | Descriptor |
|---|---|---|
| property_enable_bits | 4 | Flags for 4 candidate properties |
| reserved_bits | 6 | |
| } | | |
| } | | |

Semantics
repeat_struc_bit: a 1-bit unsigned integer indicating whether or not there are more than a certain amount of repetitive structures in the 3D model. 0 for no repetitive structure and 1 for repetitive structure.
3d_model_compr_mode: a 2-bit unsigned integer indicating the 3d model compression method used to compress a pattern, unique part and the original 3D model itself if it includes no repetitive structures.

| 3d_model_compr_mode | Meaning |
|---|---|
| 00 | SC3DMC |
| 01 | 3DMC Extension |
| 10 & 11 | ISO reserved |

QP: a 5-bit unsigned integer indicating the quality parameter. The minimum value of QP is 3 and the maximum is 31.
pattern_num: a 8-bit unsigned integer indicating the number of all patterns if it is less than 255. The minimum value of pattern_num is 1.
pattern_num_2: a 16-bit unsigned integer indicating the number of all patterns if it is not less than 255. In this case, the total pattern number is (pattern_num_2+255)
instance_num: a 16-bit unsigned integer indicating the number of all instances if it is less than 65535. The minimum value of instance_num is 1.
instance_num_2: a 32-bit unsigned integer indicating the number of all instances if it is not less than 65535. In this case, the total instance number is (instance_num_2+65535)
insta_trans_elem_bit: a 1-bit unsigned integer indicating whether "grouped instance transformation mode" or "elementary instance transformation mode" is used in this bitstream. 0 for "grouped instance transformation mode" and 1 for "elementary instance transformation mode".
insta_rotat_mode_bit: a 1-bit unsigned integer indicating the encoding mode of instance rotation transformation. 0 for spherical mode and 1 for Cartesian mode.
use_scaling_bit: a 1-bit unsigned integer indicating whether instance transformation includes scaling factors. 1 for scaling factors being included in instance transformation and 0 for not. When the scaling factors of most instances equal 1.0, the instance transformation doesn't include scaling factor. Then all the instances must have the same size with the corresponding pattern.
uni_part_bit: a 1-bit unsigned integer indicates whether there is unique part in the original 3d model. 0 means there is no unique part and 1 means there is unique part. If uni_part_bit equals 0, it also means that the end of the bitstream is reached right after the pattern instance compression data.
error_compensate_enable_bit: a 1-bit unsigned integer indicating whether there are data fields of compressed decoding error for some instances in the bitstream. 0 means there is no data field of compressed decoding error of instances in the bitstream and 1 means there are data fields of compressed decoding error of some instances in the bitstream.
property_enable_bits: a 4-bit flag in which each bit denotes whether a corresponding property (e.g., normal, color, texture coordinate) is encoded. 0 means the corresponding property is not encoded and 1 means it is encoded. The relationship between the bits and properties is shown in the following table.

| property_enable_bits | Property |
|---|---|
| A | Normal |
| B | color |
| C | texture coordinate |
| D | ISO reserved |

A3DMC_stream_data class
Syntax

| | Num. of bits | Descriptor |
|---|---|---|
| class A3DMC_stream_data{ | | |
|   if (repeat_struc_bit == 1) { | | |
|     compr_repeat_struc_data | | |
|   } | | |
|   else{ | | |
|     compr_3d_model_data | | |
|   } | | |
| } | | |

Semantics
compr_repeat_struc_data: contain the compressed 3d model, which includes repetitive structures.
compr_3d_model_data: contain the compressed 3d model, which has no repetitive structures and is encoded by the compression method indicated by 3d_model_compr_mode.
compr_repeat_struc_data class
Syntax

| | Num. of bits | Descriptor |
|---|---|---|
| class compr_repeat_struc_data{ | | |
|   compr_pattern_data | | |
|   if(insta_trans_elem_bit == 1){ | | |
|     compr_insta_elementary_data | | |
|   } | | |
|   else{ | | |
|     compr_insta_grouped_data | | |
|   } | | |
|   if (uni_part_bit == 1){ | | |
|     compr_uni_part_data | | |
|   } | | |
| } | | |

Semantics
compr_pattern_data: contain the compressed geometry, connectivity and properties of all patterns, which is encoded by the compression method indicated by 3d_model_compr_mode.
compr_insta_elementary_data: contain the compressed instance transformation data for all the pattern instances using the "elementary instance transformation mode". It is compressed in a manner that is byte aligned.
compr_insta_grouped_data: contain the compressed instance transformation data for all the pattern instances using the "grouped instance transformation mode". It is compressed in a manner that is byte aligned.

compr_uni_part_data: contain the compressed unique part data, which is encoded by the compression method indicated by 3d_model_compr_mode.

compr_insta_elementary_data class
Syntax compr_elem_insta_rotat_cartesian: contain the compressed rotation transformation of $i^{th}$ instance in Cartesian mode.

compr_elem_insta_rotat_spherical: contain the compressed rotation transformation of $i^{th}$ instance in spherical mode.

|  | Num. of bits | Descriptor |
|---|---|---|
| class compr_insta_elementary_data{ | | |
|     insta_transl_bbox | 2*32 | |
|     for (i = 0; i < numofInstance; i ++) { | | |
|         compr_elem_insta_patternID | | ec(v) |
|         if (property_enable_bits != 0000){ | | |
|             elem_insta_share_pattern_property_bit | 1 | |
|         } | | |
|         elem_insta_reflection_flag | 1 | |
|         compr_elem_insta_transl | bit_num_insta_transl( ) | f(bit_num_insta_transl( )) |
|         If (insta_rotat_mode_bit == 1){ | | |
|             compr_elem_insta_rotat_cartesian | | |
|         } | | |
|         else{ | | |
|             compr_elem_insta_rotat_spherical | | |
|         } | | |
|         if (use_scaling_bit){ | | |
|             compr_elem_insta_scaling | | ec(v) |
|         } | | |
|         if (property_enable_bits != 0000 && | | |
| elem_insta_share_pattern_property_bit ==0){ | | |
|             if (property_enable_bits &1000 == 1){ | | |
|                 compr_elem_insta_normal_header | | |
|                 compr_elem_insta_normal_data | | |
|             } | | |
|             if (property_enable_bits & 0100 == 1){ | | |
|                 compr_elem_insta_color_header | | |
|                 compr_elem_insta_color_data | | |
|             } | | |
|             if (property_enable_bits &0010 == 1){ | | |
|                 compr_elem_insta_texture_header | | |
|                 compr_elem_insta_texcoord_data | | |
|             } | | |
|         } | | |
|         If (error_compensate_enable_bit ==1){ | | |
|             elem_insta_error_compensate_flag | 1 | |
|             if(elem_insta_error_compensate_flag == 1){ | | |
|                 compr_elem_insta_error_compen_header | | ec(v) |
|                 compr_elem_insta_error_compen_data | | ec(v) |
|             } | | |
|         } | | |
|     } | | |
| } | | |

Semantics insta_transl_bbox: contains the minimum value and the maximum value of translation vector data so that quantization can be used when compressing instance translation info.

compr_elem_insta_patternID: contain the compressed pattern ID of $i^{th}$ instance.

elem_insta_share_pattern_property_bit: a 1-bit unsigned integer indicates whether or not $i^{th}$ instance share the properties with the corresponding pattern. 0 means $i^{th}$ instance doesn't share properties with the corresponding pattern and its properties needs to be compressed. 1 means $i^{th}$ instance shares properties with the corresponding pattern.

elem_insta_reflection_flag: a 1-bit unsigned intecer indicating whether the transformation of $i^{th}$ instance includes reflection. 0 means the transformation of r instance doesn't include reflection and 1 means the transformation of $i^{th}$ instance includes reflection.

compr_elem_insta_transl: contain the compressed translation vector of $i^{th}$ instance.

compr_elem_insta_scaling: contain the compressed scaling factor of $i^{th}$ instance.

compr_elem_insta_normal_header: contain the header of the compressed normal of $i^{th}$ instance. Refer to ISO/IEC 14496-16 5.2.1.3 for the detail definition.

compr_elem_insta_normal_data: contain the compressed normal of $i^{th}$ instance. Refer to ISO/IEC 14496-16 5.2.1.3 for the detail definition.

compr_elem_insta_color_header: contain the header of the compressed color of $i^{th}$ instance. Refer to ISO/IEC 14496-16 5.2.1.3 for the detail definition.

compr_elem_insta_color_data: contain the compressed color of $i^{th}$ instance. Refer to ISO/IEC 14496-16 5.2.1.3 for the detail definition.

compr_elem_insta_texcoord_header: contain the header of the compressed texture coordinates of $i^{th}$ instance. Refer to ISO/IEC 14496-16 5.2.1.3 for the detail definition.

compr_elem_insta_texcoord_data: contain the compressed texture coordinates of $i^{th}$ instance. Refer to ISO/IEC 14496-16 5.2.1.3 for the detail definition.

elem_insta_error_compensate_flag: a 1-bit unsigned integer indicates whether the next part of the bitstream is the compressed decoding error of $i^{th}$ instance. 0 means the next part of the bitstream is not the compressed decoding error of $i^{th}$ instance and 1 means the next part of the bitstream is the compressed decoding error of $i^{th}$ instance compr_elem_insta_error_compen_header: contain the header of the compressed decoding error of $i^{th}$ instance.

compr_elem_insta_error_compen_data: contain the compressed decoding error of $i^{th}$ instance.

bit_num_insta_transl( ) compute the number of bits for each persudo instance translation vector based on QP.

compr_elem_insta_rotat_cartesian class
Syntax

|  | Num. of bits | Descriptor |
|---|---|---|
| class compr_elem_insta_rotat_cartesian { | | |
|     compr_elem_insta_rotat_x0 | bit_num_rotat_cartesian( ) | f(bit_num_rotat_cartesian( )) |
|     compr_elem_insta_rotat_y0 | bit_num_rotat_cartesian( ) | f(bit_num_rotat_cartesian( )) |
|     elem_insta_rotat_z0_sgn | 1 | |
|     if (need_compensate_z0( )) { | | |
|         compr_elem_insta_rotat_z0_res | bit_num_orient_res_cartesian( ) | f(bit_num_orient_res_cartesian( )) |
|     } | | |
|     compr_elem_insta_rotat_w | bit_num_rotat_cartesian( ) | f(bit_num_rotat_cartesian( )) |
|     elem_insta_rotat_sgn_v | 1 | |
|     if (need_compensate_z1( )) { | | |
|         compr_elem_insta_rotat_z1_res | bit_num_rotat_res_cartesian( ) | f(bit_num_rotat_res_cartesian( )) |
|     } | | |
| } | | |

Semantics

The rotation transformation of $i^{th}$ instance in Cartesian mode is represented by 2 orthogonal axes (x0, y0, z0) and (x1, y1, z1).

compr_elem_insta_rotat_x0: contain the compressed x0 of $i^{th}$ instance's rotation.

compr_elem_insta_rotat_y0: contain the compressed y0 of $i^{th}$ instance's rotation.

elem_insta_rotat_z0_sgn: a 1-bit unsigned integer indicating the sign of z0 needed for calculating z0 using x0 and y0. 0 for "−" and 1 for "+".

compr_ith_insta_orient_z0_res: contains the compressed residual of the calculated z0 which is likely to be inaccurate.

compr_elem_insta_rotat_w: contain the compressed third coordinate w of $i^{th}$ instance's rotation, which may be x1, y1 or z1, depending on x0 and y0.

elem_insta_rotat_sgn_v: a 1-bit unsigned integer indicating the sign of the fifth coordinate v, which could be x1 or y1 depending on w, needed for calculating v using x0, y0, z0 and w. 0 for "−" and 1 for "+".

compr_elem_insta_rotat_z1_res: contain the compressed residual of the calculated z1 which that are likely to be inaccurate.

need_compensate_z0( ): determine whether or not the calculated z0 of $i^{th}$ instance's rotation need to be compensated. Return true if the calculated z0 of $i^{th}$ instance's rotation need to be compensated and false if the calculated z0 of $i^{th}$ instance's rotation need not to be compensated.

need_compensate_z1( ): determine whether or not the calculated z1 of $i^{th}$ instance's rotation need to be compensated. Return true if w is not z1 and the calculated z1 of $i^{th}$ instance's rotation need to be compensated. Return false if w is z1 or the calculated z1 of $i^{th}$ instance's rotation need not to be compensated.

bit_num_rotat_cartesian( ): compute the number of bits for each rotation value in cartesian coordinate system based on QP.

bit_num_rotat_res_cartesian( ): compute the number of bits for each rotation residual value in cartesian coordinate system based on QP.

compr_elem_insta_rotat_spherical class
Syntax

|  | Num. of bits | Descriptor |
|---|---|---|
| class compr_elem_insta_rotat_spherical { | | |
|     compr_elem_insta_rotat_alpha | bit_num_rotat_alpha( ) | f(bit_num_rotat_alpha( )) |
|     compr_elem_insta_rotat_beta | bit_num_rotat_beta( ) | f(bit_num_rotat_beta( )) |
|     compr_elem_insta_rotat_gamma | bit_num_rotat_gamma( ) | f(bit_num_rotat_gamma( ) |
| } | | |

Semantics

The rotation of $i^{th}$ instance in spherical mode is represented by 3 angles, alpha, beta & gamma.

compr_elem_insta_rotat_alpha: contain the compressed alpha of $i^{th}$ instance's rotation.

compr_elem_insta_rotat_beta: contain the compressed beta of $i^{th}$ instance's rotation.

compr_elem_insta_rotat_gamma: contain the compressed gamma of $i^{th}$ instance's rotation.

bit_num_rotat_alpha( ) compute the number of bits for each alpha value based on QP
bit_num_rotat_beta( ) compute the number of bits for each beta value based on QP
bit_num_rotat_gamma( ) compute the number of bits for each gamma value based on QP
compr_insta_grouped_data class
Syntax

|  | Num. of bits | Descriptor |
|---|---|---|
| class compr_insta_grouped_data{ | | |
|     compr_insta_patternID_header | 16 | |
|     compr_insta_patternID_data | | ec(v) |
|     insta_reflection_flag_data | Number of instances | |
|     compr_insta_transl_header | 16 | |
|     compr_insta_transl_data | | |
|     compr_insta_rotat_header | 16 | |
|     compr_insta_rotat_data | | |
|     if (use_scaling_bit){ | | |
|         compr_insta_scaling_header | 16 | |
|         compr_insta_scaling_data | | ec(v) |
|     } | | |
|     if (property_enable_bits != 0000){ | | |
|         insta_share_pattern_property_bit | 1 | |
|         if(insta_share_pattern_property_bit == 0){ | | |
|             if (property_enable_bits &1000==1){ | | |
|                 compr_insta_normal_header | | |
|                 compr_insta_normal_data | | |
|             } | | |
|             if (property_enable_bits &0100==1){ | | |
|                 compr_insta_color_header | | |
|                 compr_insta_color_data | | |
|             } | | |
|             if (property_enable_bits &0010==1){ | | |
|                 compr_insta_texcoord_header | | |
|                 compr_insta_texcoord_data | | |
|             } | | |
|         } | | |
|     } | | |
|     If (error_compensate_enable_bit == 1){ | | |
|         insta_error_compen_flag_data | Number of instances | |
|         for (i = 0; i < numofInstance; i ++) { | | |
|             if(insta_error_compen_flag_data[i] == 1){ | | |
|                 compr_elem_insta_error_compen_header | | |
|                 compr_elem_insta_error_compen_data | | |
|             } | | |
|         } | | |
|     } | | |
| } | | |

Semantics
compr_insta_patternID_header: a 16-bit header for the compressed pattern IDs of all instances. This data field is unused when using fixed-length codec or entropy codec which can determine compressed bitstream length automatically for coding pattern ID_data.
compr_insta_patternID_data: contain the compressed pattern IDs of all instances.
insta_reflection_flag_data: contain the reflection flags of all instances. It is compressed in a manner that is byte aligned.
compr_insta_transl_header: a 16-bit header for the compressed translation vectors of all instances. This data field is unused when using fixed-length codec or entropy codec which can determine compressed bitstream length automatically for coding transl_data.
compr_insta_transl_data: contain the compressed pseudo translation vectors of all instances. See full description in 4.9
compr_insta_rotat_header: a 16-bit header for the compressed rotation transformation parts of all instances. This data field is unused when using fixed-length codec or entropy codec which can determine compressed bitstream length automatically for coding rotat_data.
compr_insta_rotat_data: contain the compressed rotation transformation parts of all instances. It is compressed in a manner that is byte aligned. See full description in 4.10.
compr_insta_scaling_header: a 16-bit header for the compressed scaling factors of all instances. This data field is unused when using entropy codec which can determine compressed bitstream length automatically for coding scaling_data.
compr_insta_scaling_data: contain the compressed scaling factors of all instances.
insta_share_pattern_property_bit: a 1-bit unsigned integer indicates whether all instances share properties with patterns. 0 means all instances do not share properties with patterns and their properties to be compressed. 1 means all instances share properties with patterns.
compr_insta_normal_header: contain the header of the compressed normal of all instances. Refer to ISO/IEC 14496-16 5.2.1.3 for the detail definition.
compr_insta_norma_datal: contain the compressed normal of all instances. Refer to ISO/IEC 14496-16 5.2.1.3 for the detail definition.
compr_insta_color_header: contain the header of the compressed color of all instances. Refer to ISO/IEC 14496-16 5.2.1.3 for the detail definition.
compr_insta_color_data: contain the compressed color of all instances. Refer to ISO/IEC 14496-16 5.2.1.3 for the detail definition.
compr_insta_texcoord_header: contain the header of the compressed texture coordinates of all instances. Refer to ISO/IEC 14496-16 5.2.1.3 for the detail definition.

compr_insta_texcoord_data: contain the compressed texture coordinates of all instances. Refer to ISO/IEC 14496-16 5.2.1.3 for the detail definition.
insta_error_compen_flag_data: contain elem_insta_error_compensate_flag of all instances.
compr_elem_insta_error_compen_header: contain the header of the compressed decoding error of $i^{th}$ instance.
compr_elem_insta_error_compen_data: contain the compressed decoding error of $i^{th}$ instance.
compr_insta_transl_data class
Syntax

|  | Num. of bits | Descriptor |
|---|---|---|
| class compr_insta_transl_data{ | | |
|   insta_transl_bbox | 2*32 | |
|   num_node | 16 | |
|   num_dupli_leaf | 8 | |
|   for (i = 0; i < num_dupli_leaf; i ++) { | | |
|     dupli_leaf_id | | ec(dupli_leaf_id) |
|     num_dupli_insta_transl | 4 | |
|   } | | |
|   num_interval_bound | 8 | |
|   reserved_bits | | |
|   for (i = 0; i < num_interval_bound; i ++) { | | |
|     interval_bound_id | | ec(interval_bound_id) |
|   } | | |
|   occup_p0_symbols | | ec(occup_p0_symbols) |
|   occup_p1_symbols | | ec(occup_p1_symbols) |
| } | | |

Semantics
num_node: a 16-bit unsigned integer indicating the number of octree nodes.
num_dupli_leaf: an 8-bit unsigned integer indicating the number of the octree leaf nodes containing duplicate instance translation vectors, which are called as duplicate leaf nodes.
dupli_leaf_id: contain the index of the $i^{th}$ duplicate leaf node in the breadth first traversal sequence of the octree.
num_dupli_insta_transl: an 4-bit unsigned integer indicating the number of duplicate instance translation vectors that fall into the $i^{th}$ duplicate octree leaf node.
num_interval_bound: an 8-bit unsigned integer indicating the number of interval boundaries of the entire octree occupancy code sequence.
reserved_bits: contain some ISO reserved bits for the purpose of byte alignment
interval_bound_id: contain index of the $i^{th}$ interval boundary.
occup_p0_symbols: contain occupancy codes of octree nodes that are compressed with universal set of alphabet.
occup_p1_symbols: contain occupancy codes of octree nodes that are compressed with sub set of alphabet.
compr_insta_rotat_data class
Syntax

|  | Num. of bits | Descriptor |
|---|---|---|
| class compr_insta_rotat_data { | | |
|   If (insta_rotat_mode_bit == 1){ | | |
|     for (i = 0; i < numofInstance; i ++) { | | |
|       compr_elem_insta_rotat_cartesian | | |
|     } | | |
|   } | | |

-continued

|  | Num. of bits | Descriptor |
|---|---|---|
|   else{ | | |
|     for (i = 0; i < numofInstance; i ++) { | | |
|       compr_elem_insta_rotat_spherical | | |
|     } | | |
|   } | | |
| } | | |

An implementation might choose to only implement one of the two instance data packing modes. For that case, insta_trans_elem_bit in A3DMC_stream_header should be removed from the bitstream definition. If elementary instance data mode is chosen by the implementation, compr_insta_grouped_data should be removed from the bitstream definition. If grouped instance data mode is chosen by the implementation, compr_insta_elementary_data should be removed from the bitstream definition.

An implementation might choose to only implement one of the two instance rotation compression modes. For that case, insta_rotat_mode_bit in A3DMC_stream_header should be removed from the bitstream definition. If Cartesian mode for compressing instance rotation is chosen by the implementation, compr_elem_insta_rotat_spherical should be removed from the bitstream definition. If Spherical mode is chosen by the implementation, compr_elem_insta_rotat_cartesian should be removed from the bitstream definition.

An implementation might choose to not include header in the bitstream for the compressed pattern IDs, translation transformation parts, rotation transformation parts and scaling factors of all instances. For that case, compr_insta_patternID_header, compr_insta_transl_header, compr_insta_rotat_header and compr_insta_scaling_header should be removed from the bitstream definition.

Thus, according to the present principles, a 3D model is represented using the repetitive structure discovery, and a bitstream according to the syntax described above is generated and encoded to deal with the 3D model properties, such as normal, color, and texture coordinates, and to compress instances whose transformation includes reflection transformation. The model data is accessed, the pattern ID and the transformation information and the property information is determined. The pattern ID, transformation information, and the property information is grouped together, according to one of the formats described above, to generate a bitstream representative of the 3D model.

Among others, the present principles provide the following features and advantages:
1. A compressed bitstream syntax and semantics of our repetitive structure discovery based compression algorithm;
2. The solution to have elementary instance or grouped instance data options both possible in the bitstream;
3. A decoder adapted to get instance property data either from the corresponding pattern property data or from the corresponding data fields;
4. An encoder adapted to compress decoding error of instances according to quality requirement;
5. A decoder adapted to get final instance components by adding the decompressed decoding error to the components restored from decoded pattern and decoded instance transformation;
6. An encoder adapted to compress all patterns together;
7. A decoder adapted to separate patterns before restoring instances;

8. An encoder adapted to compress the four parts, i.e. reflection, rotation, translation and possible scaling parts, of instance transformation separately;

9. Compression of the rotation part of one instance transformation as 2 orthogonal axes or Eular angles; and A decoder adapted to restore the transformation matrix of a instance from the corresponding decoded reflection, translation, rotation and possible scaling parts, as shown in FIG. 4.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating a bitstream representing a 3D model, comprising:
    accessing information related to instances and respective patterns of a structure, the information including a pattern identifier and transformation information, indicative of a position of an instance within the structure, associated with the respective pattern and generating a bitstream including a header portion having a first indicator indicative of a mode for packing the information in the bitstream, and a data portion including a pattern data and an instance data, the instance data comprising the pattern identifiers and the transformation information, disposed in the bitstream, wherein the first indicator indicates that the information is packed in the bitstream in one of a first packing format and a second packing format, wherein the first packing format includes grouping together each of the pattern identifiers and their respective transformation information, and the second packing format includes grouping the pattern identifiers together, and the transformation information together.

2. The method according to claim 1, wherein the transformation information includes at least ones of a reflection part, a translation part, a rotation part, and a scaling part.

3. The method according to claim 1, further comprising accessing property information associated with each of the patterns.

4. The method according to claim 3, wherein the property information includes at least ones of normal, color and texture coordinates.

5. A non-transitory computer readable storage medium having stored thereon the bitstream generated according to claim 1.

6. An apparatus for generating a bitstream representing a 3D model, comprising:
    means for accessing information related to instances and respective patterns of a structure, the information including a pattern identifier and transformation information, indicative of a position of an instance within the structure, associated with the respective pattern; and
    means for generating a bitstream including a header portion having a first indicator indicative of a mode for packing the information in the bitstream, and a data portion including a pattern data and an instance data, the instance data comprising the pattern identifiers and the transformation information disposed in the bitstream, wherein the first indicator indicates that the information is packed in the bitstream in one of a first packing format and a second packing format, wherein the first packing format includes grouping together each of the pattern identifiers and their respective transformation information, and the second packing format includes grouping the pattern identifiers together, and the transformation information together.

7. The apparatus according to claim 6, wherein the transformation information includes at least ones of a reflection part, a translation part, a rotation part, and a scaling part.

8. The apparatus according to claim 6, wherein the means for accessing associates property information with each of the patterns.

9. The apparatus according to claim 8, wherein the property information includes at least ones of normal, color and texture coordinates.

10. A method for processing a bitstream representing a 3D model, comprising:
   determining whether the bitstream includes information related to instances and respective patterns of a structure, the information including a pattern identifier and transformation information, indicative of a position of an instance within the structure, associated with a respective pattern, in a first packing format or a second packing format; accessing the pattern identifier and the transformation information associated with the pattern in response to the determining; and
   decoding the pattern identifier and the respective transformation information to generate 3D model data, wherein the bitstream comprises a header portion having a first indicator indicative of a mode for packing the information in the bitstream, and a data portion including pattern data and instance data, the instance data comprising pattern identifiers and transformation information, wherein the first indicator indicates that the information is packed in the bitstream in one of the first packing format and the second packing format, wherein the packing format includes grouping together each of the pattern identifiers and their respective transformation information, and the second compression packing format includes grouping the pattern identifiers together, and the transformation information together.

11. The method according to claim 10, wherein the transformation information includes at least ones of a reflection part, a translation part, a rotation part, and a scaling part.

12. The method according to claim 10, further comprising accessing property information associated with each of the patterns.

13. The method according to claim 12, wherein the property information includes at least ones of normal, color and texture coordinates.

14. An apparatus for processing a bitstream representing a 3D model, comprising:
   means for determining whether the bitstream includes information related to instances and respective patterns of a structure, the information including a pattern identifier and transformation information, indicative of a position of an instance within the structure, associated with the respective pattern, in a first packing format or a second packing format;
   means for accessing the pattern identifier and the transformation information associated with the pattern in response to the determining; and
   means for decoding the pattern identifier and the respective transformation information to generate 3D model data, wherein the bitstream comprises a header portion having a first indicator indicative of a mode for packing the information in the bitstream, and a data portion including a pattern data and an instance data, the instance data comprising pattern identifiers and transformation information, wherein the first indicator indicates that the information is packed in the bitstream in one of the first packing format and the second packing format, wherein the first packing format includes grouping together each of the pattern identifiers and their respective transformation information, and the second packing format includes grouping the pattern identifiers together, and the transformation information together.

15. The apparatus according to claim 14, wherein the transformation information includes at least ones of a reflection part, a translation part, a rotation part, and a scaling part.

16. The apparatus according to claim 14, wherein the means for accessing property information associated with each of the patterns.

17. The apparatus according to claim 16, wherein the property information includes at least ones of normal, color and texture coordinates.

18. A non-transitory computer readable storage medium having stored thereon instructions for processing a bitstream representing a 3D model, the instructions comprising:
   determining whether the bitstream includes information related to instances and respective patterns of a structure, the information including a pattern identifier and transformation information associated with each instance, indicative of a position of each respective instance within the structure, associated with the respective pattern, in a first packing format or a second packing format;
   accessing the pattern identifier and the transformation information associated with the pattern in response to the determining; and
   decoding the pattern identifier and the respective transformation information to generate 3D model data, wherein the bitstream comprises a header portion having a first indicator indicative of a mode for packing the information in the bitstream, and a data portion including a pattern data and an instance data, the instance data comprising pattern identifiers and transformation information, wherein the first indicator indicates that the information is packed in the bitstream in one of the first packing format and the second packing format, wherein the first packing format includes grouping together each of the pattern identifiers and their respective transformation information, and the second packing format includes grouping the pattern identifiers together, and the transformation information together.

* * * * *